Figure 1:
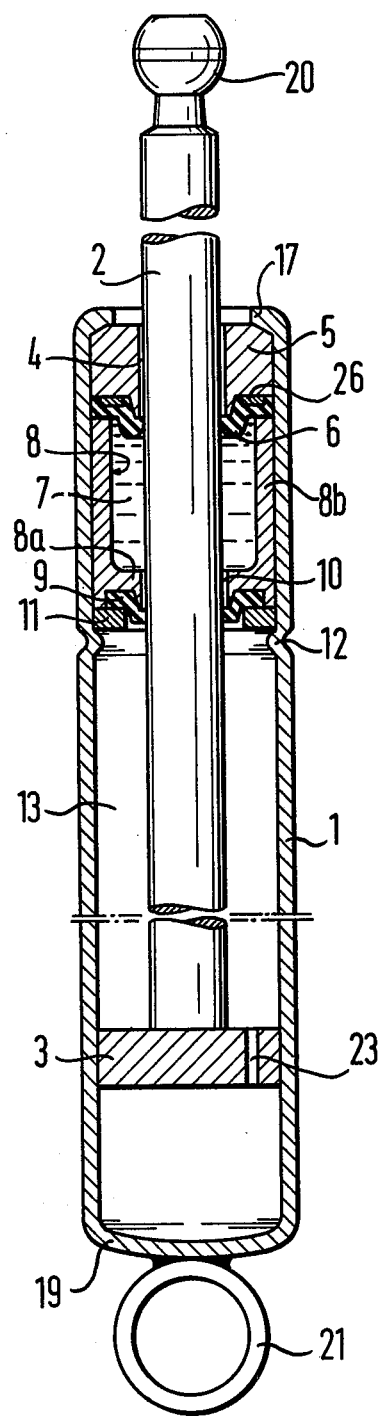

United States Patent [19]

Freitag

[11] 4,030,716

[45] June 21, 1977

[54] PNEUMATIC SUSPENSION ELEMENT

[75] Inventor: Herbert Freitag, Koblenz-Metternich, Germany

[73] Assignee: Stabilus GmbH, Koblenz-Neuendorf, Germany

[22] Filed: July 2, 1975

[21] Appl. No.: 592,787

[30] Foreign Application Priority Data

July 5, 1974 Germany .................. 7422901[U]

[52] U.S. Cl. .......................... 267/64 R; 188/317; 188/269
[51] Int. Cl.² ........................................ F16F 5/00
[58] Field of Search ............. 267/64 R, 64 B, 64 A, 267/65 R, 65 A; 293/70, 85, 86; 188/317, 269; 267/113, 124, 127, 129; 29/182, 182.2; 210/510; 277/173

[56] References Cited

UNITED STATES PATENTS

| | | | |
|---|---|---|---|
| 2,598,818 | 6/1952 | Muirhead | 210/510 |
| 3,139,159 | 6/1964 | Lob | 267/64 R |
| 3,197,191 | 7/1965 | Axthammer | 267/64 R |
| 3,856,287 | 12/1974 | Freitag | 267/64 R |

*Primary Examiner*—James B. Marbert
*Attorney, Agent, or Firm*—Hans Berman

[57] ABSTRACT

A pneumatic suspension element of the piston-and-cylinder type in which the escape of compressed gas from the cylinder cavity is prevented by a liquid in a portion of the cylinder cavity through which the piston rod passes. The compressed gas and liquid are introduced into the cylinder cavity through resiliently sealed gaps about the piston rod and/or through a porous partition separating the liquid-filled cavity portion from the gas-filled portion.

5 Claims, 2 Drawing Figures

U.S. Patent June 21, 1977 Sheet 1 of 2 4,030,716

PNEUMATIC SUSPENSION ELEMENT

This invention relates to pneumatic suspension elements, and particularly to an improved suspension element of the type in which a piston moves in a portion of a cylinder cavity containing a body of compressed gas, and the piston rod extends outward of the cavity from the piston through a liquid filled portion of the cavity.

In the known suspension elements of the type briefly described, the liquid materially contributes to preventing escape of gas from the cylinder cavity along the piston rod. However, the known units require a normally closed nipple on the cylinder through which gas is introduced initially into the cylinder cavity, and through which the gas cushion in the cavity may be replenished. The nipple significantly increases the cost of the cylinder, reduces the mechanical strength of the cylinder, and must be carefully sealed to avoid loss of gas pressure.

It is the primary object of this invention to provide a pneumatic suspension element of the type described which can be charged with gas under pressure much higher than atmospheric pressure without requiring a sealable nipple or its equivalent on the cylinder, thereby avoiding the shortcomings of a cylinder so equipped.

With this object and others in view, as will presently become apparent, the suspension element of the invention has a cylinder whose cavity is sealed in one axial direction by a first radial wall. An annular second radial wall bounds the cavity in the other axial direction. An annular partition fixedly mounted in the cavity axially separates a first cavity portion adjacent the first radial cylinder wall from a second cavity portion adjacent the second radial cylinder wall. An axially movable piston divides the first cavity portion into two compartments. A piston rod fastened to the piston extends axially from the first cavity portion through the partition, the second cavity portion, and the second radial cylinder wall outward of the cavity.

A first sealing arrangement is radially interposed between the piston rod and the axial cylinder wall adjacent the partition for preventing flow of fluid between the two cavity portions in the absence of a difference of fluid pressure between the portions while permitting fluid flow from one portion to the other when the fluid pressure in the one portion is higher than in the other one. A second sealing arangement radially interposed between the piston rod and the axial cylinder wall axially adjacent the afore-mentioned second radial wall prevents outward flow of fluid from the second cavity portion.

Figure 2:
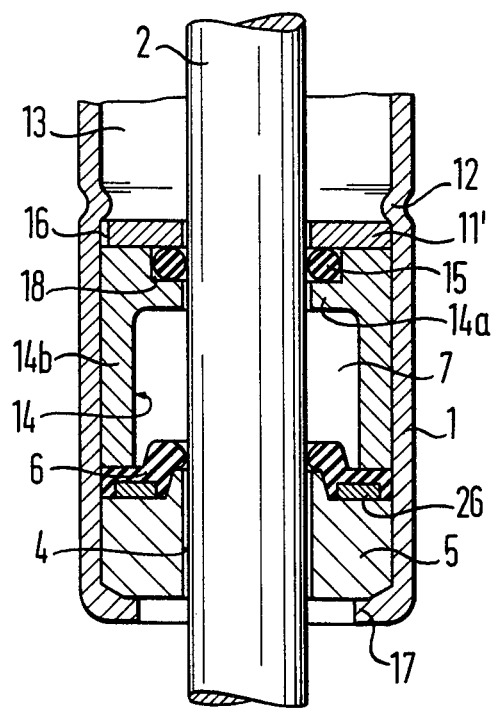

Other features, additional objects, and many of the attendant advantages of this invention will readily be appreciated as the same becomes better understood from the following detailed description of preferred embodiments when considered with the appended drawing in which:

FIG. 1 shows a pneumatic suspension element of the invention in elevational section on its axis; and FIG. 2 illustrates a modified suspension element in fragmentary elevational section, the modified element being inverted for charging with fluid.

Referring now to the drawing in detail, and initially to FIG. 1, there is shown a pneumatic spring and/or shock absorber for use in the suspension of an automotive vehicle and the like whose principal, externally visible elements are a cylinder 1 and a piston rod 2. The cylinder 1 is an imperforate, unitary, cup-shaped element whose integral first, radial wall 19 carries a fastening eye 21. The piston rod 2 may be fastened to associated structure by a ball-and-socket joint whose ball member 20 is fixedly attached to the free end of the piston rod 2 outside the cylinder cavity. The inner end of the piston rod 2 is fastened to a piston 3 provided with a throttling passage 23 connecting the two compartments of a first cavity portion 13 axially separated by the piston 3. In the normal operating condition of the illustrated suspension element, the cavity portion 13 is filled with air or nitrogen under a pressure much higher than atmospheric pressure, and the cavity portion will be referred to hereinafter as the gas chamber of the element.

The axial end of the cylinder cavity remote from the wall 19 is closed by an annular second radial wall 5 whose central bore is greater in diameter than the cylindrical piston rod 2 so as to leave an annular gap 4 between the piston rod 2 and the wall 5. Escape of fluid from the cylinder cavity is prevented by a resilient, annular sealing disc 6 reinforced by a flat, molded-in metal ring 26. The disc 6 is axially clamped between the wall 5 and the rim of a tubular spacer 8b which is integral with a radial, annular partition 8a. The spacer 8b and the partition 8a jointly constitute a cup-shaped member 8, and the central aperture in the partition 8a is sufficiently larger than the cross section of the piston rod 5 passing therethrough to leave an annular gap 10. The member 8, the sealing disc 6, and the piston rod 5 constitute the walls of a liquid-filled chamber 7 in a second portion of the cylinder cavity.

The axial position of the member 8 is secured by an internal rib 12 on the axial cylinder wall on which a flat washer 11 rests and supports the partition 8a. A sealing disc 9 is partly received in an annular recess of the partition 8a and tapers in a radially inward direction toward a narrow, annular contact face slidably engaging the piston rod 2. The sealing disc 6 similarly tapers toward the piston rod.

The wall 5, the sealing discs 6, 9, the cup-shaped member 8, and the washer 11 are introduced into the cylinder during assembly of the suspension element after the piston 3 and piston rod 2 and after the rib 12 is formed, and are secured in the cylinder 1 by beading the rim portion 17 of the cylinder 1 over the radial wall 5.

The assembly then is inverted and charged with gas under pressure by placing the beaded rim portion 17 downward on a sealing ring at the outlet of a tank of compressed gas. The gas under pressure passes through the gap 4, expands the disc 6 to enter the chamber 7, thereafter passes through the gap 10, expands the disc 9, and fills the chamber 13 to the desired pressure. When the rim 17 then is lifted from the tank outlet, the gas pressure in the chambers 7, 13 forces the tapering lips of the discs 6, 9 against the piston rod 2, thereby preventing the escape of fluid in the manner of a check valve whose movable valve element is constituted by the resilient, circular lip of the sealing disc.

Liquid, preferably a fairly viscous oil, is thereafter forced into the gap 4 in a manner analogous to the introduction of the gas described above. The amount of liquid is carefully metered so that the liquid displaces all gas from the chamber 7 and drives it into the chamber 13 without introducing significant amounts of liquid into the gas chamber.

The suspension element is ready for use in any desired position as soon as it is disconnected from its outside source of liquid. In the absence of a difference between the fluid pressures in the chambers 7, 13, the disc 9 prevents fluid flow between the chambers due to the resiliency of the disc material which does not interfere with the necessary axial movement of the piston rod in the installed element.

The modified suspension element of the invention shown in FIG. 2 is identical with the apparatus illustrated in FIG. 1 as far as not explicitly shown and described otherwise. FIG. 2 shows the element after assembly of its metallic and resilient parts, ready to receive fluids in a position turned 180° from that seen in FIG. 1.

The modified suspension element has a cup-shaped member 14 consisting of sintered powder metal, preferably sintered iron powder, whose pores provide capillary passages through the radial partition 14a which forms the centrally apertured bottom of the cup-shape, and through the tubular spacer 14b constituted by the axial wall. The orifices of the capillary passages in the face of the partition 14a directed toward the gas chamber 13 are too small to be capable of pictorial representation on the scale of the drawing, More than 90% of these orifices are blocked by a flat washer 11' which rests on the rib 12 and axially secures the member 14 and associated structure. The capillary orifices in the radial end face of the partition 14a are exposed only in several notches 16 in the circumference of the washer, only one notch 16 being seen in FIG. 2.

An annular groove 18 in the partition 14a is open in a radially inward direction and axially toward the gas chamber 13. It receives an O-ring 15 under the axial pressure of the washer 11' which extends over the axially open side of the groove 18. The piston rod 2 is guided in the washer 11' and the partition 14a with as little clearance as is possible without interfering with axial mobility of the piston rod, but fluid flow along the piston rod is prevented by the O-ring 15.

The modified suspension element is charged with gas as described above, a check valve being formed by the sealing disc 6, and gas flowing from the normally liquid-filled chamber 7 into the gas chamber 13 through the pores in the powder metal member 14. Oil is thereafter forced into the chamber 7 until the pores in the powder metal are partly filled with liquid. In the absence of a pressure differential between the chambers 7, 13, no liquid flows by gravity into the gas chamber 13, and no gas can enter the liquid-filler chamber 7 regardless of the position of the suspension element.

While check valves relying on tapering lips of annular, resilient discs have been shown and described, other check valves may be provided to permit fluid flow through the gaps 4, 10 in one axial direction only, and the use of a resilient, metallic valve member is specifically contemplated. As has been shown in FIG. 2, the fluid entering the cylinder cavity need not flow along the piston rod, and conduits through the partitions 8a, 14a of a cross section greater than that of the capillary pores in the partition 14a may be controlled by check valves of any known and suitable type.

It should be understood, therefore, that the foregoing disclosure relates only to preferred embodiments and that it is intended to cover all changes and modifications of the examples of the invention herein chosen for the purpose of the disclosure which do not constitute departures from the spirit and scope of the invention set forth in the appended claims.

What is claimed is:

1. A pneumatic suspension element comprising:
   a. a cylinder having an axial wall radially bounding a cavity in said cylinder and a first radial wall sealing said cavity in one axial direction;
   b. an annular, second, radial wall bounding said cavity in the other axial direction;
   c. an annular partition fixedly mounted in said cavity and axially separating a first portion of said cavity adjacent said first radial wall from a second portion of said cavity adjacent said second radial wall;
   d. a piston axially movable in said first portion and axially dividing the same into two compartments;
   e. a piston rod fastened to said piston and axially extending from said first portion through said partition, said second portion, and said second radial wall outward of said cavity,
      1. said partition being formed with capillary passages extending therethrough between said portions and constituting first sealing means radially interposed between said piston rod and said axial wall axially adjacent said partition for preventing flow of fluid between said portions in the absence of a difference of fluid pressure between said portions, while permitting fluid flow from one of said portions to the other portion when the fluid pressure in said one portion is higher than in said other portion; and
   f. second sealing means radially interposed between said piston rod and axial wall axially adjacent said second radial wall for preventing outward flow of fluid from said second portion of said cavity.

2. An element as set forth in claim 1, wherein said partition has a face directed toward one of said portions, said first sealing means including a cover member of a material impermeable to fluid and covering more than one half of said face.

3. An element as set forth in claim 2, wherein said first sealing means further include an annular sealing element enveloping said piston rod, said partition being formed with an axially open, annular groove receiving said sealing element, said cover member covering said groove and axially retaining said sealing element.

4. An element as set forth in claim 2, wherein said cover member is formed with a notch in the outer circumference thereof, said face of said partition being exposed axially toward said one portion through said notch.

5. An element as set forth in claim 1, wherein said partition essentially consists of sintered powder metal.

* * * * *